(12) United States Patent  
Pachov (10) Patent No.: US 7,331,252 B2
(45) Date of Patent: Feb. 19, 2008

(54) BRAKING SYSTEM

(76) Inventor: Yavor Pachov, 299 cours Emile Zola, F-69100 Villeurbanne (FR)

( * ) Notice: Subject to any disclaimer, the term of this patent is extended or adjusted under 35 U.S.C. 154(b) by 501 days.

(21) Appl. No.: 10/694,808

(22) Filed: Oct. 29, 2003

(65) Prior Publication Data
US 2005/0092116 A1 May 5, 2005

(51) Int. Cl.
F16H 1/16 (2006.01)
F16H 1/20 (2006.01)
F16H 55/18 (2006.01)

(52) U.S. Cl. .......................... 74/425; 74/440
(58) Field of Classification Search .......... 74/411.5, 74/425, 440, 441, 409; 188/290, 292, 293, 188/294, 83, 271; 254/274, 296, 342, 343
See application file for complete search history.

(56) References Cited

U.S. PATENT DOCUMENTS 1,427,025 A 8/1922 Schlafly

| | | | | |
|---|---|---|---|---|
| 4,023,430 A | * | 5/1977 | Imamura | 74/412 TA |
| 4,625,946 A | * | 12/1986 | Clark et al. | 254/274 |
| 5,005,777 A | * | 4/1991 | Fernandez | 242/390.2 |
| 5,144,849 A | | 9/1992 | Aihara et al. | |
| 5,727,664 A | * | 3/1998 | Chico | 188/382 |
| 5,834,662 A | * | 11/1998 | Stoll et al. | 74/425 |
| 6,352,143 B1 | * | 3/2002 | Niaura et al. | 188/267.1 |

FOREIGN PATENT DOCUMENTS

DE 297 02 062 U1 3/1997
EP 0 869 295 A2 10/1998

\* cited by examiner

Primary Examiner—Richard Ridley
Assistant Examiner—James Pilkington
(74) Attorney, Agent, or Firm—Young & Thompson (57) ABSTRACT

This braking system (S) is adapted to be used with a mechanism having one or several turning members (34), and comprises a toothed wheel (6), connected in rotation with at least one turning member (34) to be braked, and an endless screw (8), driven in rotation by a motor (5) during rotation of the turning member (34), this screw (8) being in permanent engagement with the toothed wheel (6). The screw (8) is contained in a bore of a diameter slightly greater than that of the screw (8).

1 Claim, 9 Drawing Sheets

BRAKING SYSTEM

The present invention relates to a braking system, intended to be fitted to a mechanism comprising one or more members over which it is important to maintain control in all circumstances, in particular for safety reasons. In an advantageous application, the system according to the invention is used to brake the winding drum of a winch or similar mechanism, in the event of a failure of this winch, in particular a failure of the members for driving the drum.

U.S. Pat. No. 4,625,946 and French patent application No. 2,189,302 describe safety systems comprising a toothed wheel connected rotationally to the rotating member to be braked, and a worm driven rotationally by a motor and permanently in mesh with the toothed wheel.

The worm drive motor allows the braking system to follow the movement of the rotating member to which the toothed wheel is connected. In the event of a failure, this toothed wheel drives the worm, thereby generating friction between its teeth and the thread of this worm, which ensures the braking of the said rotating member.

It turns out that a failure of the braking system is possibly to be feared in certain situations depending on the speeds and inertia of the rotating members(s) to braked, particularly if the braking stress is sudden and intense.

The present invention aims to remedy this fundamental disadvantage.

The system to which it relates comprises, in a manner known per se, a toothed wheel, connected rotationally with respect to at least one rotating member to be braked, and a worm, driven rotationally by a motor upon the rotation of the rotating member and permanently in mesh with the toothed wheel.

According to the invention, the worm is contained in a bore with a diameter slightly larger than that of the worm. This worm is thus maintained in a radial direction with respect to the toothed wheel throughout its length, and is consequently able to take up the stresses exerted to it by the toothed wheel in this same direction without any damage.

Furthermore, the mounting of this worm in the braking system is particularly simple to perform.

Preferably, the worm comprises at least one cylindrical bearing surface coaxial with its threaded portion and the said bore has a diameter slightly larger than that of this or these cylindrical bearing surfaces.

The thread of the worm thus does not bear against the wall of the part which delimits the bore.

Advantageously, the braking system comprises specific energy absorption/dissipation means, in addition to the energy dissipation means constituted by the friction of the teeth of the wheel against the thread of the worm.

Thus, in the event of sudden and intense stressing of the braking system, the energy transmitted to the worm by the wheel is absorbed and/or dissipated not only by the said friction but also by intervention or the said specific additional means.

These specific energy absorption/dissipation means may comprise a sliding mounting of the worm in the said bore and energy absorption/dissipation means associated with this worm and actuated by it upon its sliding.

These associated energy absorption/dissipation means may comprise at least one resilient means, such as a spring, interposed between at least one end of the worm and the walls of the part delimiting the bore.

This or these resilient means also have the advantage of maintaining the worm in position during its normal operation, and guaranteeing, in the event of braking, that the worm always has a sliding travel available.

These means may also comprise:

a liquid contained in the space delimited by at least one piston, against which one end of the worm comes to bear, and one or more conduits and/or interstices for this liquid to escape upon the sliding of the worm, this or these conduits and/or interstices having reduced sections suitable for allowing the said liquid to escape only over a non-instantaneous time interval.

This liquid may be more or less viscous and/or lubricating, in particular oil, so as to serve also to lubricate the wheel and the worm.

The said piston may in particular be formed by an aforementioned cylindrical bearing surface.

The said one or more conduits and/or interstices may comprise means for adjusting the flow of liquid, in order to allow the braking system to be adapted to the specificities of a mechanism to be equipped, and/or means for preventing the return of this liquid in order to make it possible to obtain a different damping for each sliding direction of the worm.

In this case of sliding of the worm the system may furthermore include sensors or detectors of the sliding of the worm which actuate command or control means which act on the means for driving the said one or more rotating members.

The said specific energy absorption/dissipation means may also comprise friction connecting means between the toothed wheel and its hub, or between the toothed wheel and the shaft receiving this wheel, freeing the pivoting of this wheel with respect to this hub beyond a certain torque threshold with friction.

These specific energy absorption/dissipation means may comprise a flexible and/or floating mounting of the braking system with respect to the frame which contains it.

For a better understanding of the invention, it is described again below with reference to the appended schematic drawing showing, by way of non-limiting examples, several embodiments of the braking system to which the invention relates.

The parts or elements of one embodiment which are identical or similar in another embodiment will be identified by the same reference numerals and will not again be described.

The braking system S shown in FIGS. 1 to 5 comprises a toothed wheel 6, intended to be connected rotationally with respect to at least one rotating member to be braked (the drum 34 of the winch shown in FIG. 7) and a worm 6, driven rotationally by a motor 5 upon the rotation of the rotating member 34 and permanently in mesh with the toothed wheel 6.

Figure 1:
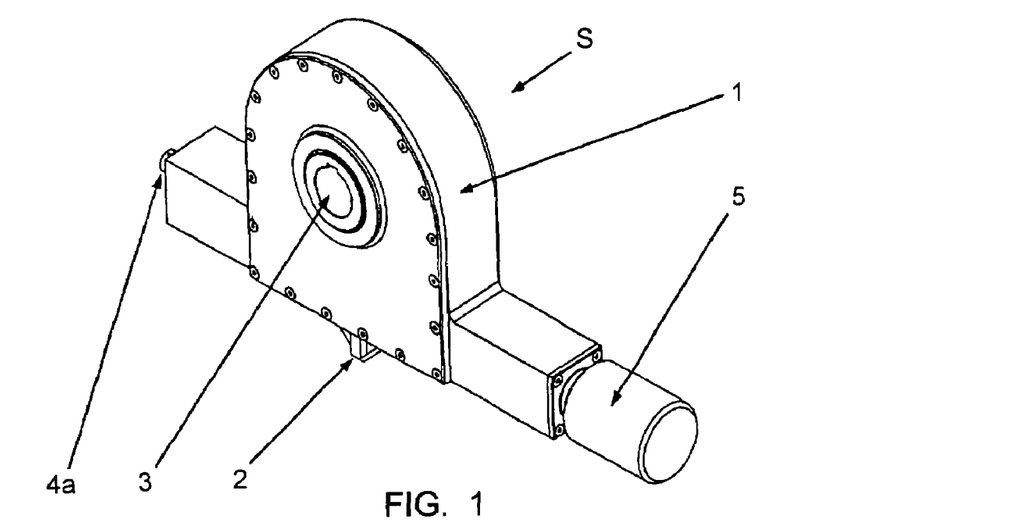
FIG. 1 is an isometric view thereof.
Figure 2:
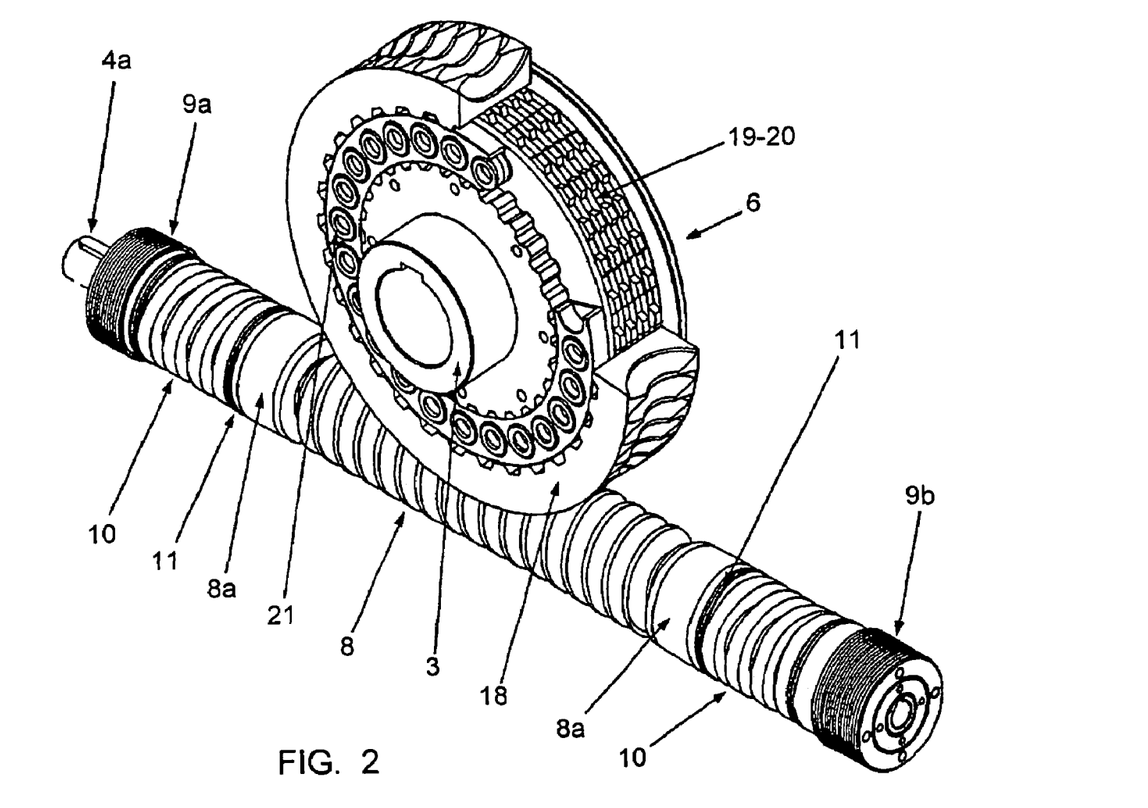
FIG. 2 is an isometric, partially cutaway view of its internal parts.
Figures 3, 3A:
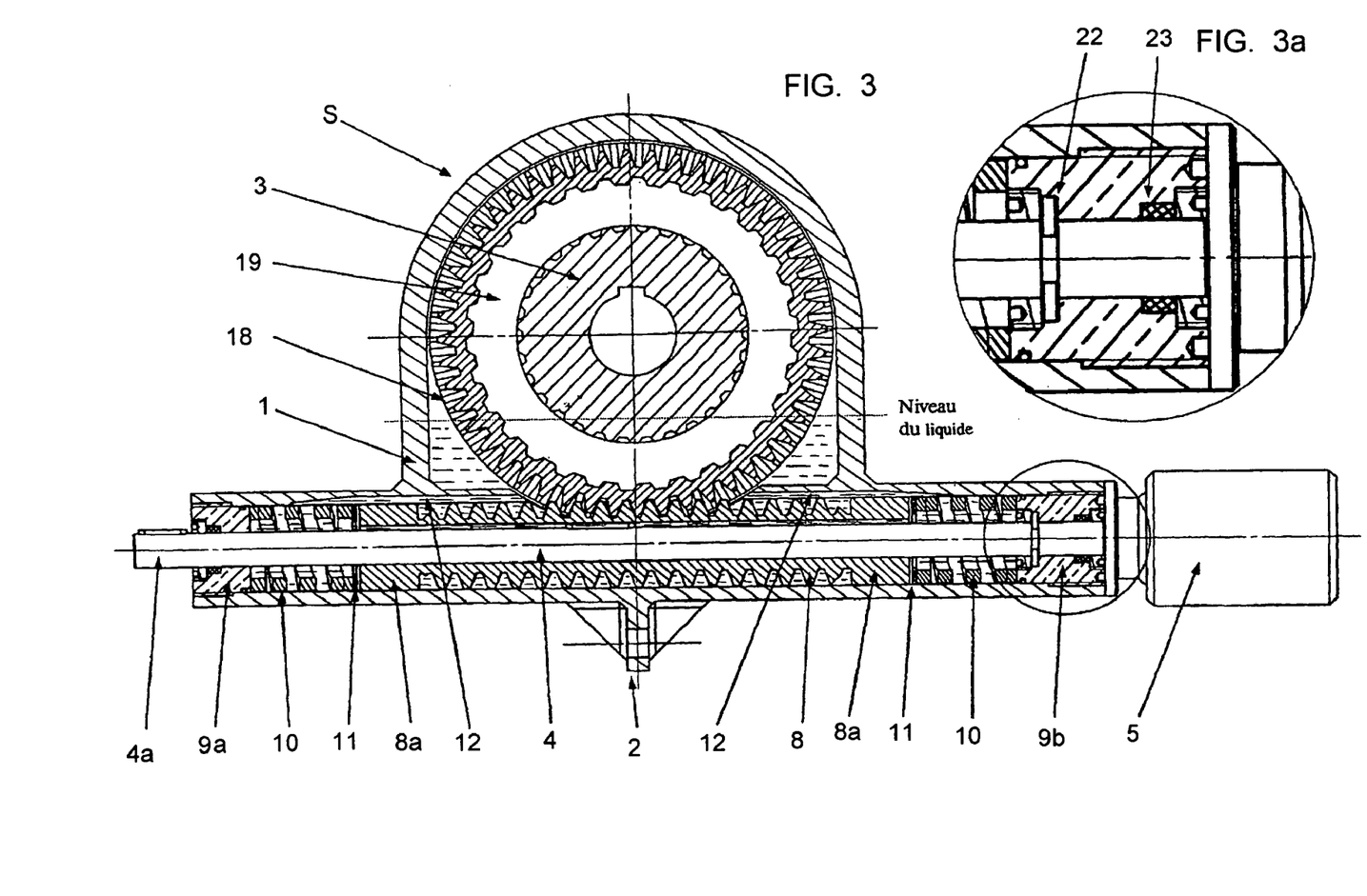
FIG. 3 is a longitudinal sectional view.
FIG. 3A is an enlarged view of the encircled detail in FIG. 3.

The system S comprises a housing 1 which serves to accommodate the bearings 17 of the shaft 3 of the wheel 6 and the bearings 9a and 9b of the shaft 4 of the worm 8.

One of the ends of the shaft 4 is actuated by the motor 5, which may have an incorporated brake (not shown), while the other end has a stub 4a which can receive a crank or any other removable actuating means (not shown), thus providing a backup means for operating the safety shaft, particularly when its main drive is unavailable. A coupling arm 2 adjoining the housing 1 allows the system S to be fixed to the frame of the apparatus (not shown) on which it is employed.

The worm 8 is inserted into a bore formed by two coaxial tubular extensions of the housing and the lower part of the chamber of this housing containing the toothed wheel. The worm 8 can slide inside this bore, as well as its shaft 4, to which, in contrast, it is rotationally fixed. Its two ends each have a cylindrical bearing surface 8a, with a diameter slightly less than the bore of the housing 1, which play a dual role of journals and pistons.

The shaft 4 of the worm 8 is supported by two bearings 9a and 9b, which also ensure the axial stoppage 22 and sealinq 23 thereof. These same bearings 9a and 9b serve as axial stops for the worm 8, via springs 10 and friction washers 11.

The system S is filled with lubricating liquid L, which occupies the free space of the bore of the housing 1 up to a level shown in FIG. 3. In order to move in sliding fashion, the worm 8 must therefore drive away the quantity of liquid L trapped between it and the corresponding bearing 9a, 9b.

The axial speed of the worm 8 is a function of the volume of liquid which is able to escape from this space. It is therefore expedient to create at least one passage which allows the liquid to escape, in a limited way. The housing 1 and/or the worm 8 and/or the shaft 4 of the worm must consequently be configured in an appropriate manner with hollow spaces.

Figures 4, 4A:
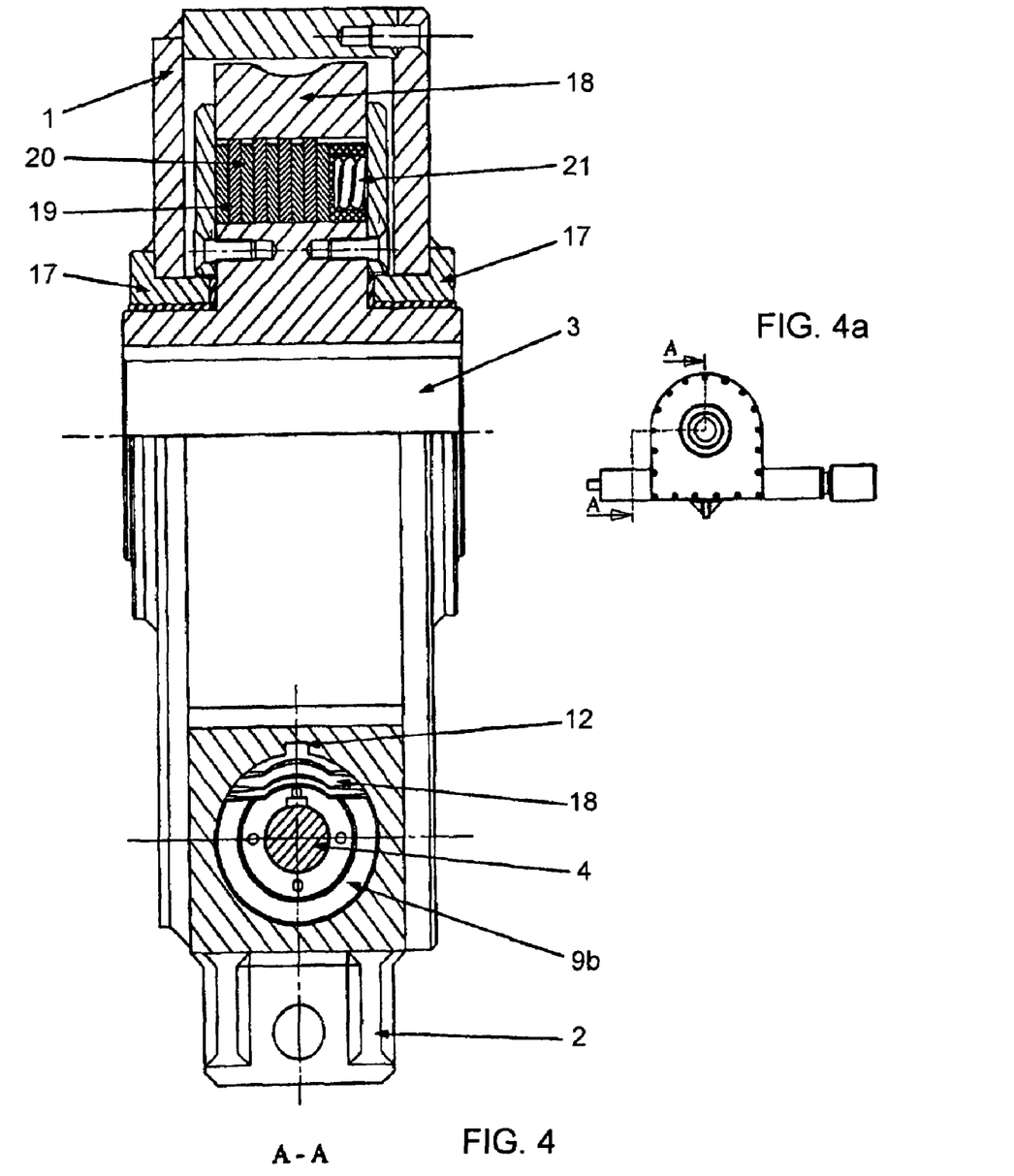
FIG. 4 is a cross-sectional view along the line A-A of FIG. 4A, with the worm removed.

According to the example presented in FIGS. 3 and 4, a groove 12, made along the wall delimiting the bore, allows the liquid to pans towards the rear of the worm 8 when the latter has a tendency to move under the effect of the wheel 6. The groove 12 has a limited section, which may also vary along the bore thereby allowing the resistance to the movement of the worm 8 to he programmed.

Figure 5:
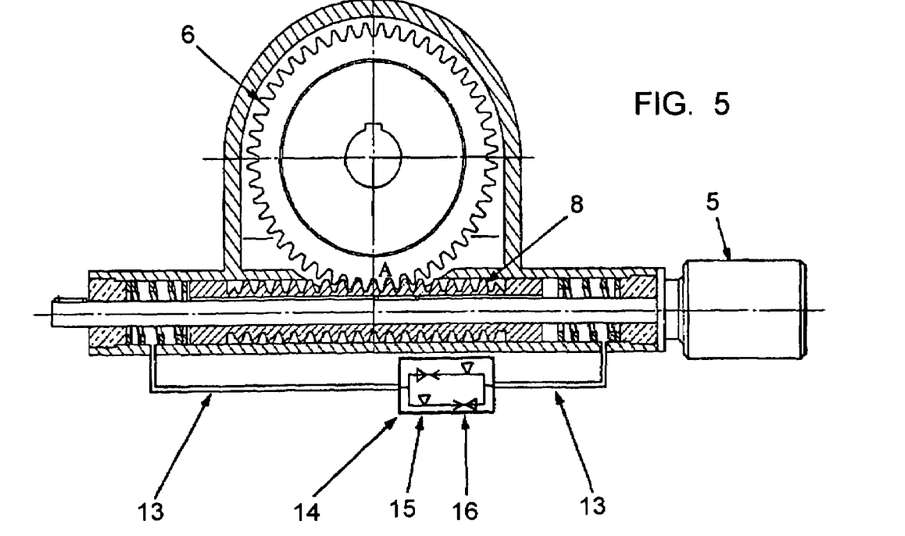
FIG. 5 is a view of a variant, in cross-section.

FIG. 5 shows a variant with adjustable hydraulic damping. The two spaces on either side of the worm 8 communicate via lines 13 outside the housing 1. A housing 14 contains at least one adjusting valve 15. The use of at least one non-return valve 16 makes it possible to obtain a different damping for each sliding direction of the worm 8, depending on whether this valve allows or prevents the flow of fluid.

The shaft 3 of the wheel 6 is supported by its bearings 17, which also ensure the axial stoppage and optionally sealing thereof. The transmission of the torque between the shaft 3 and the toothed ring 18 is effected via the friction in a multi-disc torque limiter composed of discs 19 in mesh with the toothed ring 18, of discs 20 in mesh with the shaft 3 and of an assembly of resilient elements 21 providing the necessary pressure between the discs.

Figure 6A:
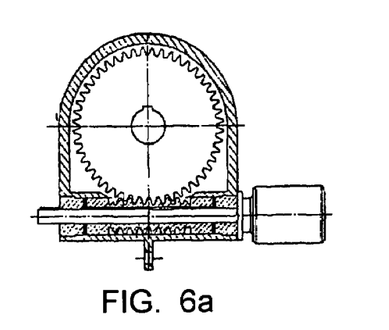
FIGS. 6a to 6d show schematically, in section, embodiment variants.
Figure 6B:
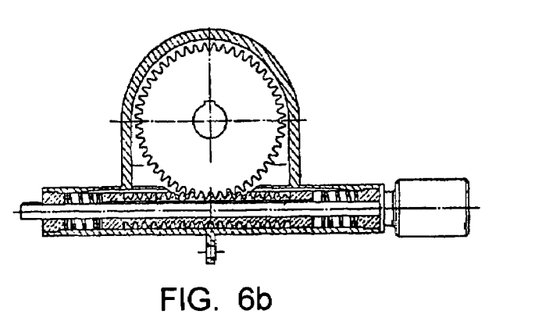
Figure 6C:
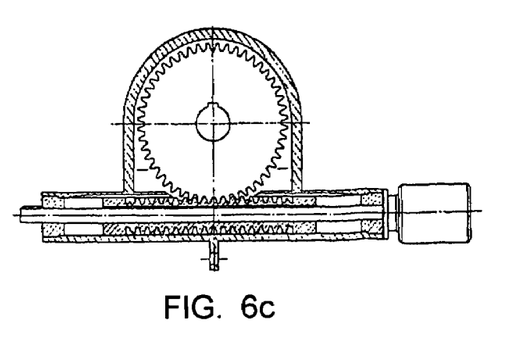
Figure 6D:
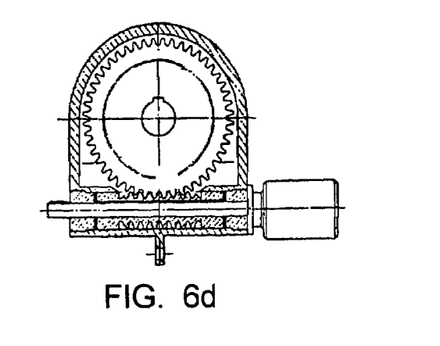

FIGS. 6a to 6d show variants of the system S in which respectively, the system S does not comprise springs 10, nor groove 12, nor a multi-disc torque limiter 19 to 21 as mentioned above (FIG. 6a);

the system S comprises springs 10 and the groove 12 but the wheel 6 is not connected to its shaft by a multi-disc torque limiter 19 to 21 as mentioned above (FIG. 6b);

the system S comprises only the groove 12 (FIG. 6c);

the system S comprises only a multi-disc torque limiter 19 to 21 as mentioned above (FIG. 6d).

Any combination of these various energy absorption/dissipation means are possible.

Figure 7:
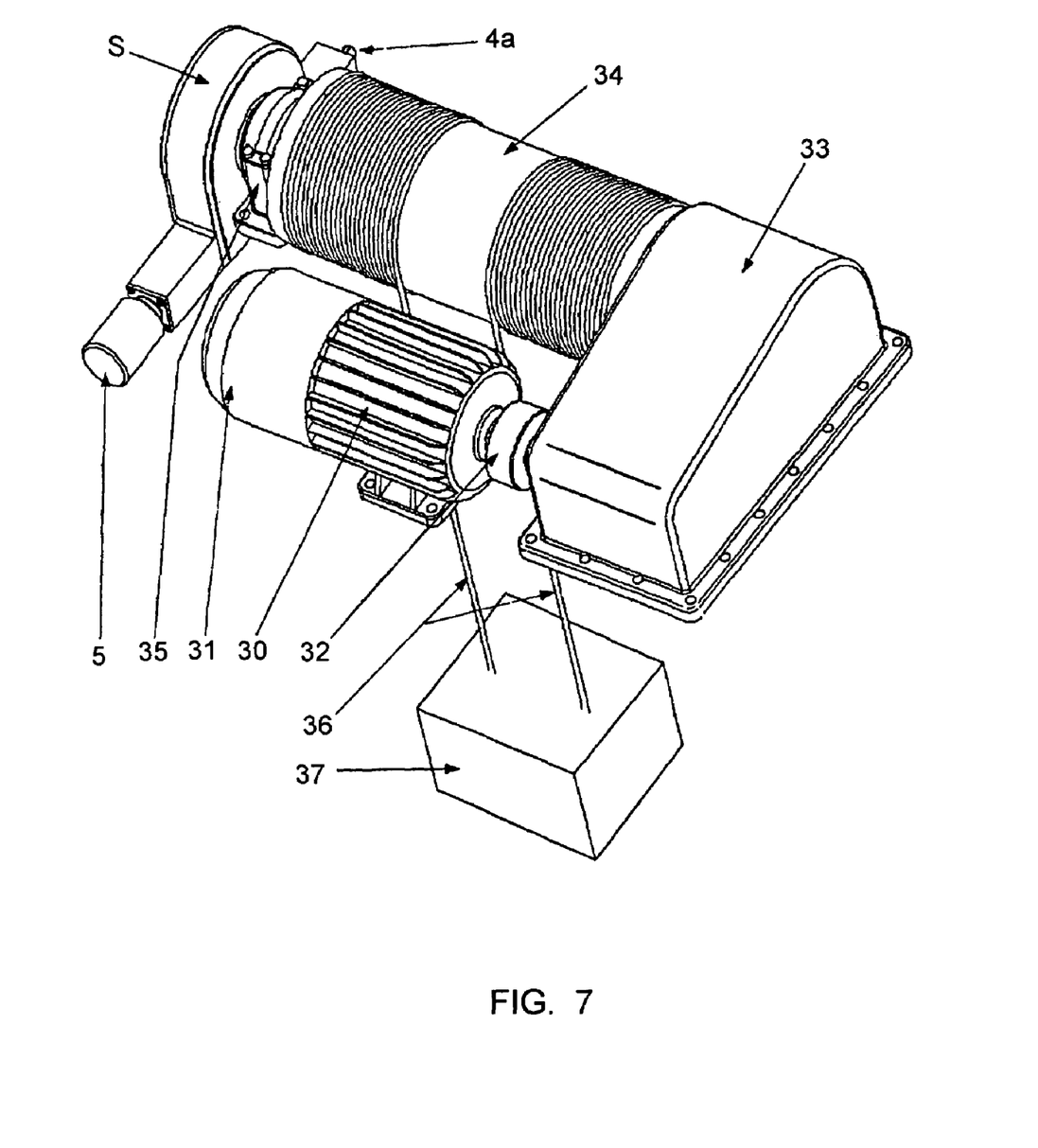
FIG. 7 is an isometric view of a winch with U-shaped kinematic chain, equipped with the system according to the invention.
Figure 8:
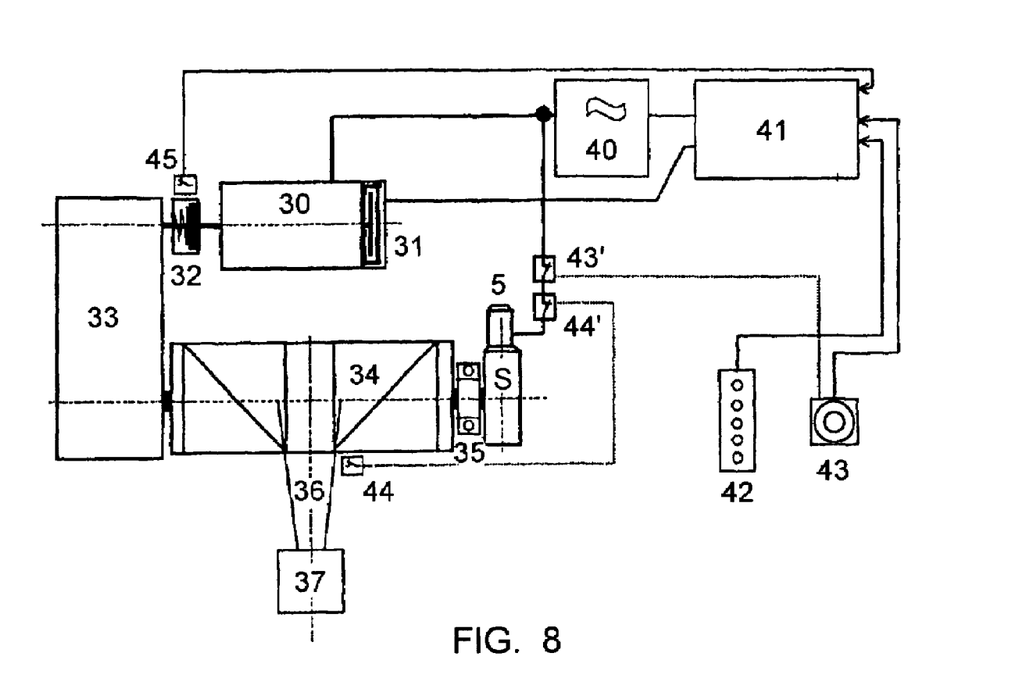
FIG. 8 is a diagram of an example of the connection of the winch to the corresponding electrical part.
Figure 9:
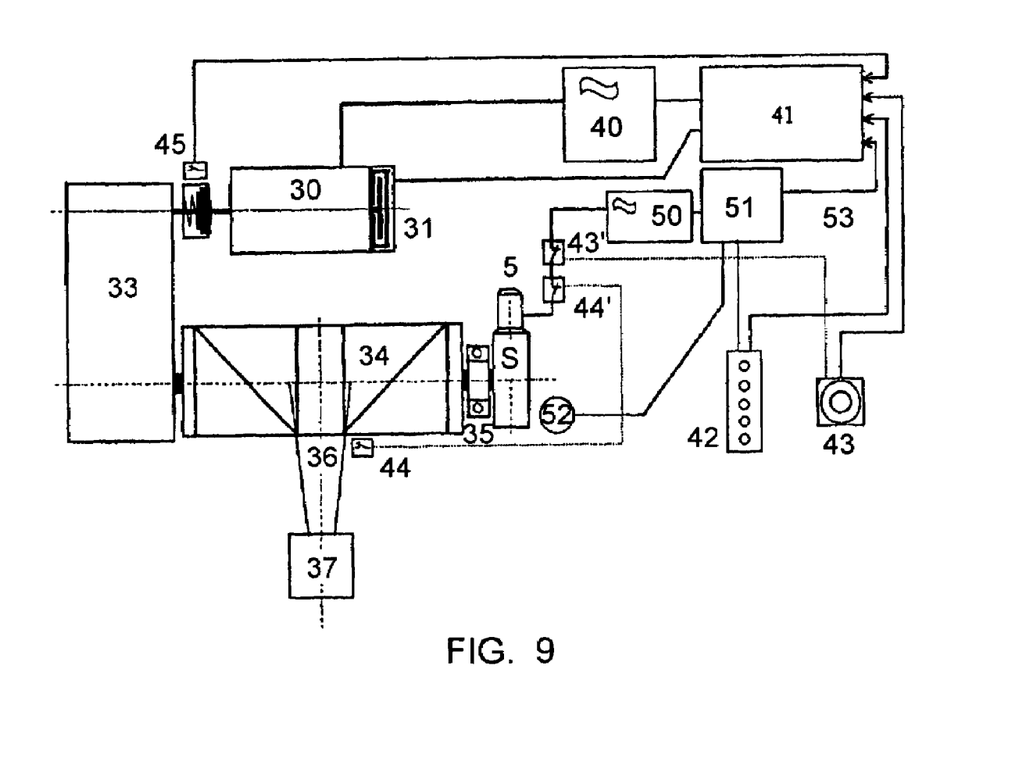
FIG. 9 is a diagram of an example of the connection of the winch to the corresponding electrical part, in a version which is more complex but also offers greater safety than the example of the connection according to FIG. 8.

The application example presented in FIGS. 7 to 9 is given as a guide and without limitation. The lifting of loads is an area very representative of the problems solved by the system S. This example makes it possible to demonstrate the advantages resulting therefrom.

FIG. 7 is an isometric view of the system S applied to a conventional lifting mechanism, with a U-shaped kinematic chain.

The "conventional" part of the mechanism is mounted on a framework (not shown) and consists of an electric motor 30 with integrated brake 31 which drives, by means of an optionally torque-limiting coupling 32, the high-speed shaft of a cylindrical gear speed reducer 33. The winding drum 34 for two cables 36 which suspend the load 37 is supported at one end and is driven directly by the low speed shaft of the speed reducer 33. At the other end of the drum 34, its shaft is supported by a bearing 35 and directly engages with the system S. In this example, the system S is mounted in "floating" fashion on the drum shaft 4 and a reaction arm rotationally locks it with respect to the framework.

The motor 30 and the speed reducer 33 are chosen traditionally, that is to say they provide the power necessary for lifting the nominal load. The same goes for the brake 31, which may of course be separate from the motor.

The motor 5 associated with the system has a torque just sufficient to drive the worm 8 alone and is consequently of very low power, especially compared with the motor 30. The influence of the torque on the rotational speed of the system motor 5 must be as little as possible. The motor 5 may be, for example, an asynchronous AC or parallel DC motor, or a brushless motor, or else a stepping motor.

The safety system is dimensioned with the aim of guaranteeing its stability at a total maximum torque comprising:

the static torque due to the suspended mass 37, the dynamic torque due to the deceleration of the suspended mass 37, the dynamic torque due to the deceleration of the mass moments of inertia of the rotating parts of the mechanism, excluding the parts optionally decoupled by a torque limiter, the torque to which the optional torque limiter 32 is adjusted, referred to the system S.

The system S acts in the following way:

In normal operation, in the ascending or descending direction, the system transmits a very low torque to the drum: it accompanies the movement without opposing it.

In the event of a break in the kinematic chain in ascent, the system locks immediately: the drum 34 is stopped.

In the event of a break in the kinematic chain descent, after the worm 8 has reached the no-load rotational speed of this worm 8 driven by its motor 5, the wheel 6 starts to transmit a torque to the worm 8: the system S locks and the drum 34 is stopped.

In the event of overspeed in descent or ascent, an electrical failure or slippage of the torque limiter 32, after the worm 8 has reached the said no-load rotational speed, the wheel 6 starts to transmit a torque to the worm 8: the system S locks and the drum 34 is stopped, In the event of inconsistency between the direction of rotation of the main motor 30 and the motor 5, the system S locks immediately.

A mechanical or electrical failure of the system S itself should also lead to its locking. Even in the event of the low-speed shaft breaking on the side of the system S, control of the load 37 is still ensured by the kinematic "power" chain of the winch remaining intact.

Once locked and if the kinematic chain is intact, the system S can he unlocked:

either by reversing the direction of rotation of the two motors 30 and 5 with respect to the direction of rotation during which the locking occurred, or by momentarily reversing the direction of rotation of the motor 30 with respect to the direction of rotation during which the locking occurred, which leads to unlocking and locking of the system S in the opposite direction, and consequently makes it possible to start again in the initial direction if the motors 30 and 5 are restarted in this direction.

Where the kinematic chain is not intact, or in the event of a motor or supply problem, a manual or motor-driven backup drive may be employed on the shaft stub 4a in order to lower the load 31.

The shock due to the more or less sudden locking of the wheel 6/worm 8 gearing is damped by the springs 10 and the flow of liquid into the groove 12, and, also, where appropriate, by the freeing of the pivoting of the wheel 6 with respect to its hub by mutual friction of the discs 19 and 20.

In order to limit the dynamic stresses while reducing the stoppage time in the event of the system locking, a torque limiter 32 may be provided.

There are several ways of achieving the synchronisation of the motor 5 with the main motor 30. For example, in the case of AC motors or stepping motors, the two motors can be supplied with currents of equal frequency as in the exemplary diagram of FIG. 8, or where the frequencies have a preset fixed relationship between them, it is also possible, depending on the backlashes and the reaction times, that the starting of the motor 30 may have to be delayed with respect to the starting of the motor 5. A variable supply specially developed for the system motor 5 by devices of the "electronic controller" and "programmable controller" type may be advantageously employed.

The supply to the system motor 5 may be developed by the apparatus control system from information on the operating parameters of speeds, accelerations, torques, integrity, etc., supplied by appropriate sensors. In this case, the locking of the system may be controlled.

FIG. 8 shows an exemplary embodiment of the control system of the application example. It again shows, schematically and arranged in the same way as in FIG. 7, the main motor 30, the service brake 31, the torque-limiting coupling 32, the speed reducer 23, the drum 34, the lifting cable 36, the load 37, the bearing 35 and the safety system S. The main motor 30 and the system motor 5 are AC motors. They are supplied in parallel by the same frequency variator 40. The motors 30 and 5, the main speed reducer 33 and the speed-reducing ratio of the system S conform to the rules set out above. The frequency variator and the service brake are controlled by a programmable controller 41, which processes the information coming from the control station 42, the emergency stop 43, an upper overtravel detector 44 for detecting if the lifting travel is exceeded and a detector 45 for detecting slippage in the torque-limiting coupling 32.

The stoppage of the system motor causes immediate locking of the system and constitutes the emergency stop means. In addition to the automatic triggering of the system as described above, its triggering may be brought about by actuating the emergency stop button 43, by means of one of the contacts of the latter 43' and by the upper overtravel cutoff switch 44 being reached. There is thus a maximum level of safety, since the opening of the contacts 44' and 43' directly guarantees immediate stoppage. In order to further reinforce the safety and protect the main motor 30, which if it continued to be supplied could suffer damage, the information "emergency stop" and "upper overtravel" are likewise transmitted to the controller 41, which cuts the supply to the main motor 30 and activates the service brake 31. Finally, the slippage detector 45 plays a similar role in the case of automatic triggering of the system, by bringing about, via the controller 41, the stoppage of the two motors 30 and 5 and the activation of the service brake 31.

According to this diagram, the failures which are safely and effectively overcome by employing the safety system are:

kinematic chain break,
dynamic unwinding,
static unwinding,
overspeed.

Moreover, it intervenes advantageously in the processing of the:

upper overtravel,
emergency stop.

However, in the diagram of FIG. 8, there are still risks that the winch might perform uncontrolled movements, since the two motors are supplied in parallel and the information from the control station is not compared with the actual movement of the winch. Indeed, a fault of the control station 42, of the control system in general, which is represented merely by the comptroller 41 for simplification, but is much more complicated in reality, or of the variator 40 can lead to unintentional movements, for example inadvertent supplying of the motors 30 and 5 or a start in the wrong direction.

FIG. 9 shows an exemplary diagram which solves this problem. The supply to and speed control of the motor 5 are performed separately here from those of the main motor. The microcontroller 51 and the low-power variator 50 are dedicated solely to the safety system S. The control station 42 has two channels separated by command. Thus, each of the controllers 41 and 51 processes the commands coming from its own link to the control station. An encoder 52 informs the system controller 51 of the speed and direction of rotation of the drum 34. The system controller 51 is equipped with a self-diagnosis function and informs the controller 41 via the link 53 with the signal "test OK".

According to this diagram, additional safety features compared with the diagram of FIG. 8 are provided:

in the event of inconsistency between the commands received by the controller 41 and the controller 51, the motors 30 and 5 are supplied inconsistently. Since the motors 30 and 5 are not synchronised, the system looks, except if the fault involves giving a "speed" instruction in the right direction, but abnormally high to the system motor 5, the same applies in the event of a failure of one of the two controllers 41 and 51, where the system motor 5 receives an abnormally high "speed" instruction, the consequence of which would be to degrade its "overspeed" safety role, the information given by the encoder 52 allows the controller 51 to detect the fault and trigger an immediate stoppage.

Another advantage of this diagram is a greater flexibility in the synchronisation of the system motor 5 with the main motor 30, made possible by the separate variable supply to each of the two motors.

Figure 10:
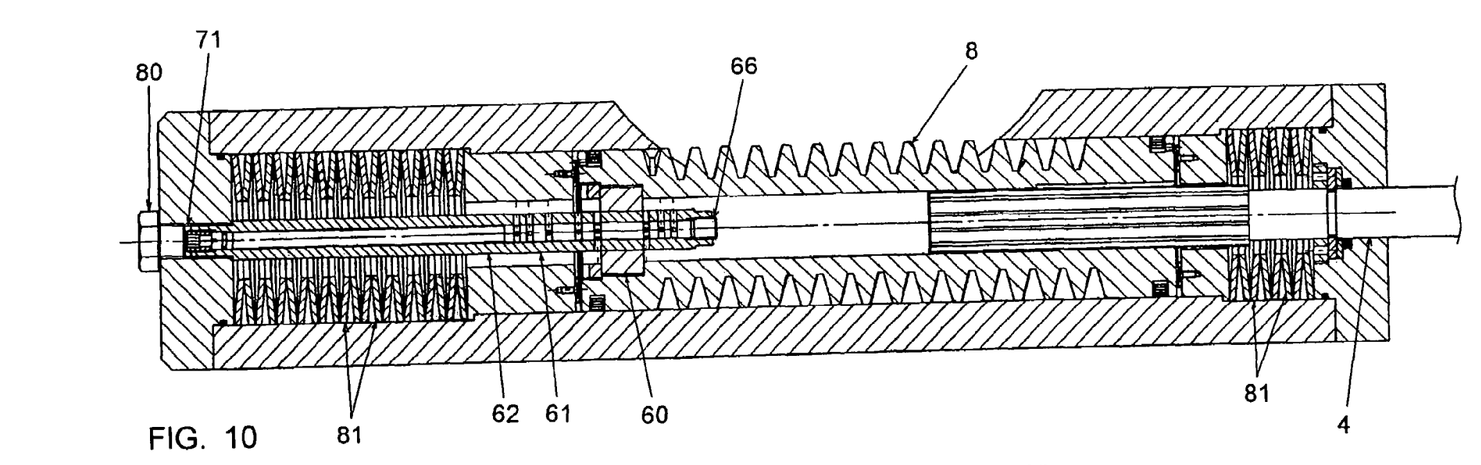
FIG. 10 is a longitudinal cross-sectional view of a sub-assembly of the braking system according to the invention, according to a second embodiment.

FIG. 10 shows another embodiment of adjustable hydraulic means for shock absorbing for the screw 8 when the latter is urged slidably by the toothed wheel.

In this case, the screw 8 is internally hollow and contains a ring 60 secured to it, a tubular member 61, engaged adjustably through this ring 60 and a rod 62 engaged adjustably in the member 61 and blocked relative to it by means of screws 66 and 71.

Figure 11:
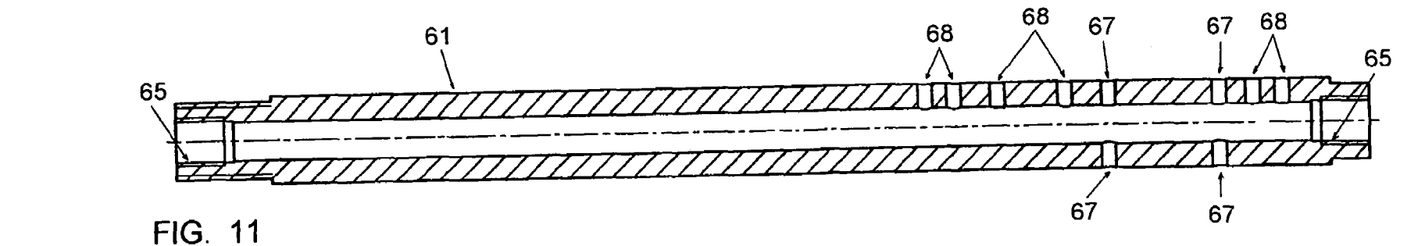
FIGS. 11 and 12 are longitudinal cross-sectional views of two members forming a part of this second embodiment.
Figure 12:
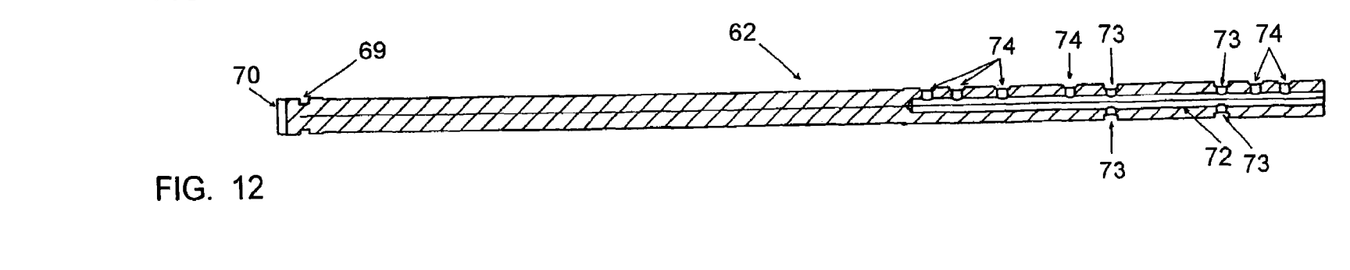

The tubular member 61 and the rod 62 are more particularly shown in FIGS. 11 and 12.

The part 61 has, at each end, a tapped hole 65 adapted to receive the screws 66 and 71. On the side of one end, it comprises two pairs of radial holes 67 diametrically opposed and a series of radial holes 68 opening on the same side, these holes 67 and 68 passing through its wall. The distance separating, in the longitudinal direction of the members 61, two consecutive holes 68 decreases in a direction away from the holes 67.

The rod 62 has at one end a transverse groove 70 adapted to receive a screwdriver and a throat 69 for a sealing joint. On the side of its other end, it comprises an axial blind hole 72, two pairs of radial holes 73 diametrically opposed and a series of radial holes 74 opening on the same side, these holes 73 and 74 passing through its wall.

Figure 13:
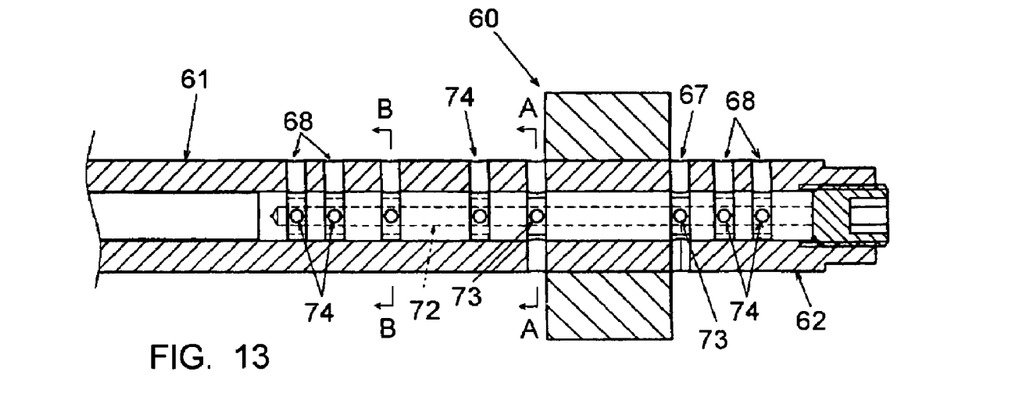
FIGS. 13 to 15 are longitudinal cross-sectional views of members thereof, in three different relative positions.
Figure 14:
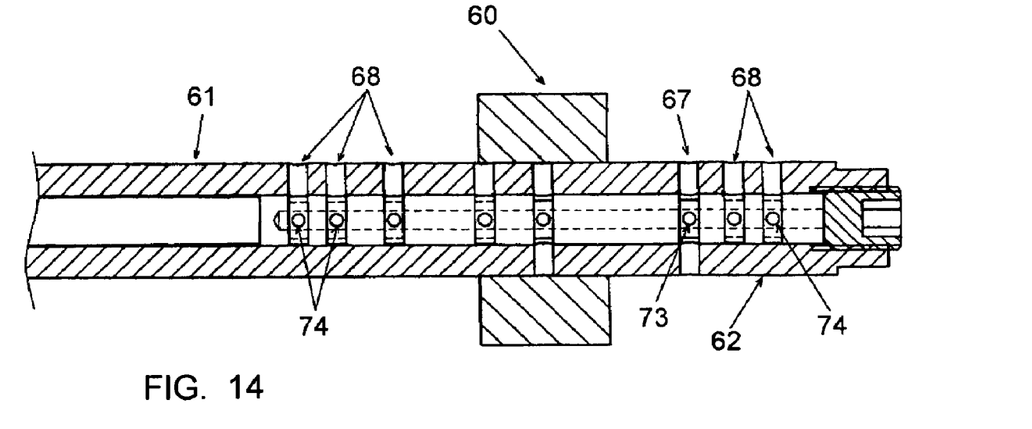
Figure 15:
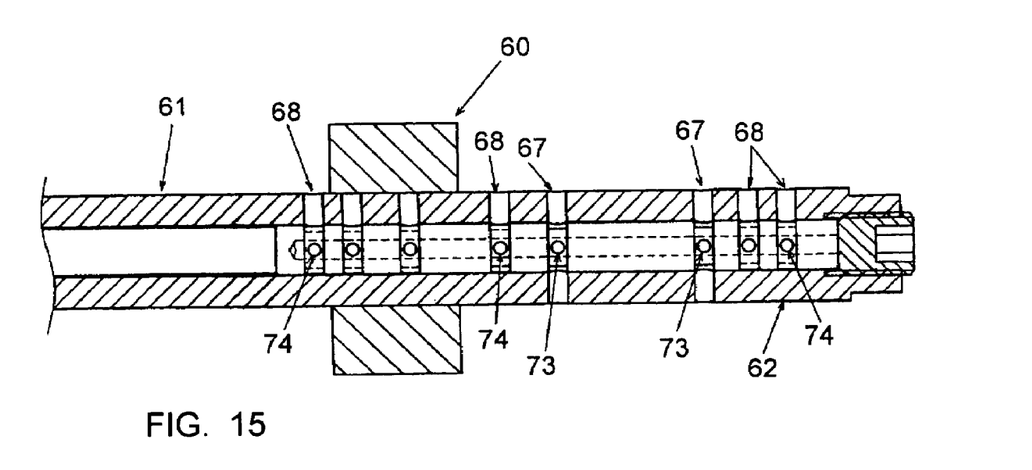

As shown in FIG. 10 and more particularly in FIGS. 13 to 15, each hole 73, 74 is in the same transverse plane as a hole 67, 68 respectively, a corresponding respective hole 67, 68 when the pierced end of the rod 62 bears against the screw 66. Tightening or loosening this screw 66 permits adjusting this position.

Figure 16A:
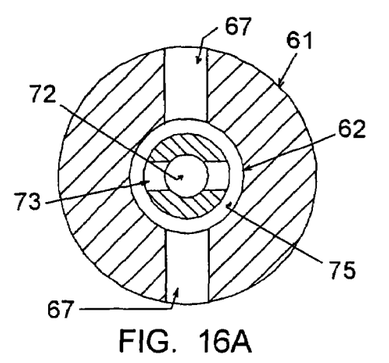
FIG. 16A is a transverse cross-sectional view on the line A-A of FIG. 13.
Figure 16B:
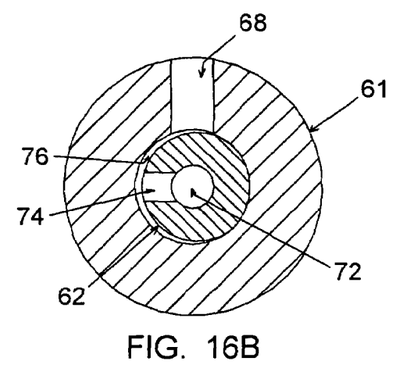
FIG. 16B is a transverse cross-sectional view on the line B-B of FIG. 13.

With reference to FIG. 16A, it will be seen that the rod 62 comprises a throat 75 of constant depth, arranged in the same plane as the two holes 73 of a same pair; with reference to FIG. 16B, it will be seen that the rod 62 comprises groove 76 provided in the same plane as each hole 74, this groove 76 extending over a portion of the circumference of the rod 62 and having a variable depth, its greatest depth being facing the opening of the hole 74.

Figure 17A:
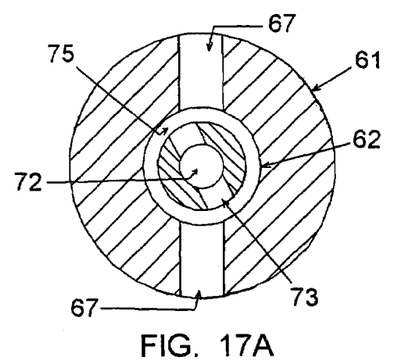
FIG. 17A is a view similar to FIG. 16A in another relative position of the parts.
Figure 17B:
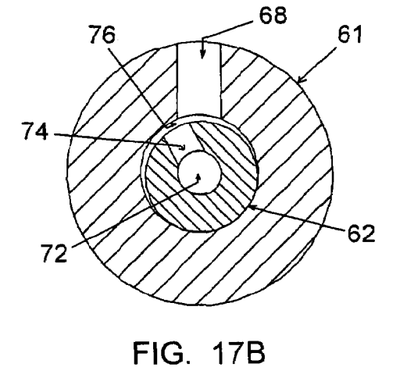
FIG. 17B is a view similar to FIG. 16B of these parts in another relative position.

It will thus be seen, by comparing FIGS. 16B and 17B, that the cross-section of the communication between a hole 68 and the corresponding hole 74 varies according to the angular position of the rod 62 relative to the rod 61. On the other hand, as is seen in FIGS. 16A and 17A, because of the constant depth of the throat 75, the communication cross-section of a hole 73 with the corresponding hole 67 remains constant.

As shown in FIG. 10, the system S comprises moreover a screw 71 that can be screwed into the bore 65 of the unpierced end of the rod 62, to bear against this unpierced end and thereby to immobilize frictionally the rod 62 in a given angular position relative to the member 61, this position having been previously given to the rod 62 with the help of a tool that bears against this rod 62 at the level of the groove 70. The screw 71 is pierced so as to permit the tool to reach the groove 70 without disassembling the screw 71. A screw plug 80 is then emplaced on the housing to improve sealing and to serve as a safety means.

In the absence of pressure on the screw 8 by the toothed wheel 6, the ring 60 is located, relative to the member 61, in the position shown in FIGS. 10 to 13, predetermined by the resilient means located on opposite sides of the screw 8. In the embodiment shown in FIG. 10, these resilient means are Belleville washers 81.

The assembly of holes 67, 68, 73, 74 located on the left side of the ring 60 communicate through the axial hole 72 with the holes 73, 74, 67, 68 located on the right side of this ring.

When the screw 8 is urged slidably, it moves the ring 60 to the left in FIGS. 13 to 15, reducing the number of holes 67, 68, 73, 74 for flow of the oil contained in the left portion of the housing. The holes 67 and 73 are immediately covered (compare FIG. 14), not permitting the flow of oil except through the holes 68 and 74, whose cross-section of communication has been adjusted, as a function of the apparatus to be equipped, by the angular positioning of the rod 62 relative to the member 61, as described above.

The greater the movement of the screw 8 and the greater the number of holes 68, 74 that are exposed reduces rapidly, because of the decrease of the distance separating the consecutive holes in the longitudinal direction, thereby providing a progressive damping of the screw 8.

Figure 18:
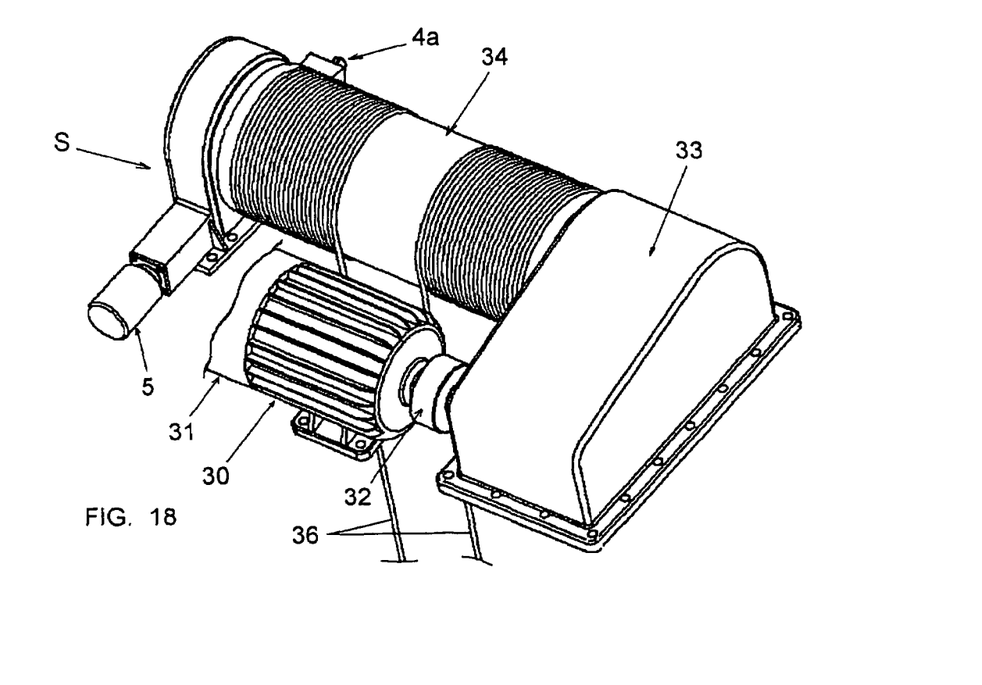
FIG. 18 is a view of the braking system similar to FIG. 7, according to a modified embodiment.

FIG. 18 itself shows a modification relative to the apparatus shown in FIG. 7, such that the braking system S according to the invention can serve directly as a bearing for the drum 34 receiving the cable 36.

It goes without saying that the invention is not limited to the embodiment described above by way of example but that, on the contrary, it embraces all embodiment variants thereof which come within the scope of protection defined by the appended claims.

The invention claimed is:

1. Braking system (S), intended to be fitted to a mechanism, with one or more rotating members (34), comprising a toothed wheel (6), connected rotationally with respect to at least one rotating member (34) to be braked, and a worm (8), driven rotationally by a motor (5) upon the rotation of the rotating member (34), this worm (8) being permanently in mesh with the toothed wheel (6); characterized in that the worm (8) is contained in a bore with a diameter close to that of the worm (8), wherein the system comprises specific energy absorption/dissipation means (10, L, 12; 13 to 16; 19 to 21), in addition to the teeth of the wheel (6) and the thread of the worm (8), said specific energy absorption/dissipation means comprise a sliding mounting of the worm in the bore and energy absorption/dissipation means (10, L, 12) associated with this worm (8) and actuated by it upon its sliding, said associated energy absorption/dissipation means comprise:

a liquid (L) contained in the space delimited by at least one piston (8*a*), against which one end of worm (8) comes to bear, and the walls of the part (1) delimiting the bore, and one or more paths for this liquid (L) to escape upon the sliding of the worm (8), this or these paths having sections suitable for allowing the liquid (L) to escape only over a non-instantaneous time interval, said one or more paths comprise means (15) for adjusting the flow of liquid (L), and the means (15, 61, 62) for adjusting the flow rate of the liquid (L) comprise a ring (60) secured to the worm (8), a tubular member (61), engaged adjustably through this ring (60) and a rod (62) engaged adjustably in the tubular member (61), the tubular member (61) and the rod (62) having radial holes (67, 68, 73, 74) communicating with each other, the rod (62) having grooves (76) extending in the circumferential direction and of variable depth, and being adapted to be disposed in a predetermined angular position relative to the tubular member (61).

\* \* \* \* \*